(12) United States Patent
Oxley et al.

(10) Patent No.: US 9,718,391 B1
(45) Date of Patent: Aug. 1, 2017

(54) COLLAPSIBLE LADDER RACK

(71) Applicants: Randall Oxley, Swisher, IA (US); Neal L. Oxley, Des Moines, IA (US)

(72) Inventors: Randall Oxley, Swisher, IA (US); Neal L. Oxley, Des Moines, IA (US)

( * ) Notice: Subject to any disclaimer, the term of this patent is extended or adjusted under 35 U.S.C. 154(b) by 0 days.

(21) Appl. No.: 15/218,598

(22) Filed: Jul. 25, 2016

Related U.S. Application Data

(60) Provisional application No. 62/336,949, filed on May 16, 2016.

(51) Int. Cl.
*B60R 9/06* (2006.01)
*B60P 3/40* (2006.01)
*B62D 33/02* (2006.01)

(52) U.S. Cl.
CPC ...... *B60P 3/40* (2013.01); *B60R 9/06* (2013.01); *B62D 33/0207* (2013.01)

(58) Field of Classification Search
CPC ..... B60R 9/00; B60R 9/06; B60P 3/40; B62D 33/0207
See application file for complete search history.

(56) References Cited

U.S. PATENT DOCUMENTS

| | | | |
|---|---|---|---|
| 5,662,254 A | 9/1997 | Lemajeur et al. | |
| 6,517,134 B2 * | 2/2003 | Armstrong | B60P 3/40 224/405 |
| 7,104,429 B1 * | 9/2006 | Flores | B60R 9/00 211/207 |
| 7,766,202 B2 * | 8/2010 | Depot | B60R 9/06 224/504 |
| 8,833,621 B2 * | 9/2014 | Burkhardt | B60P 3/40 224/403 |
| 9,487,152 B2 * | 11/2016 | Scott | B60R 9/045 |
| 2008/0079277 A1 | 4/2008 | Wethington | |
| 2009/0255966 A1 * | 10/2009 | Prapavat | B60R 9/00 224/403 |

* cited by examiner

*Primary Examiner* — Corey Skurdal
(74) *Attorney, Agent, or Firm* — Shuttleworth & Ingersoll, PLC; Jason Sytsma

(57) ABSTRACT

A pair of ladder rack assemblies each attachable to the bed of the truck. The pair of ladder rack assemblies are positioned apart from each other along a longitudinal length of the bed of the truck to support opposing ends of the ladder. Each ladder rack assembly comprises of a first support member attachable to the side of the truck. A first swing arm pivotally attached to the first support member, a second swing arm pivotally attached to the first swing arm. The first swing arm can move between a first position in the bed of the truck and a second position extending upward from the bed of the truck. The second swing arm can move between a first position substantially parallel with the first swing arm and a second position substantially perpendicular to the first swing arm.

10 Claims, 8 Drawing Sheets

COLLAPSIBLE LADDER RACK

This application claims priority to U.S. Provisional Application No. 62/336,949 filed on May 16, 2016, the contents of which are hereby incorporated by reference herein.

BACKGROUND

This invention relates to ladder racks for vehicles, and more particularly, this invention relates to a collapsible ladder rack.

Many truck owners use their personal truck as their work truck as well. For work, truck owners often need a ladder rack, but not all the time. Most ladder racks are large, bulky, and cumbersome to take off. If it is taken off the truck, there must be a place to store the large apparatus. Some conventional ladder racks have been designed so that they can be partially collapsed while still remaining mounted to a truck's bed. Though such conventional ladder racks do help conserve some floor space in a truck's bed box and also reduce rattle, such ladder racks often cannot be collapsed down low enough to permit a truck bed cover to be mounted over a bed box. Also, such ladder racks often undesirably require that their crossbar assemblies still be detached and laid loosely in a truck's bed.

In view of the above, there is a desire in the art for a collapsible ladder rack that can be collapsed and stored in a substantially unitary, secure, and reduced-volume configuration in the bed box of a truck.

SUMMARY

Disclosed is a ladder rack attachable to a bed of a truck for carrying a ladder. The ladder rack comprises of a pair of ladder rack assemblies each attachable to the bed of the truck. The pair of ladder rack assemblies are positioned apart from each other along a longitudinal length of the bed of the truck to support opposing ends of the ladder.

More specifically, each ladder rack assembly comprises of a first support member attachable to the side of the truck. A first swing arm is pivotally attached to the first support member. A second swing arm is pivotally attached to the first swing arm. The first swing arm can move between a first position in the bed of the truck and a second position extending upward from the bed of the truck. The second swing arm can move between a first position substantially parallel with the first swing arm and a second position substantially perpendicular to the first swing arm.

A first axis extends through the first support member and the first swing arm about which the first swing arm moves between the first position and the second position. The first axis is defined by a first hole in the support member and a first hole in the first swing arm and a pin extending through the first hole in the first support member and the first hole in the first swing arm. A bracket can be attached to the first swing arm near an end of the first swing arm opposite from the first hole in the first swing arm. The bracket extends perpendicularly from the second swing arm, and the bracket further comprises of a second axis extending through the bracket and the second swing arm about which the second swing arm moves between the first position and the second position. The second axis is defined by a first hole in the bracket and a second hole in the second swing arm and a pin extending through the first hole in the bracket and the second hole in the second swing arm.

The bracket can comprise of a second hole and the second swing arm can comprise of a third hole which are aligned with each other when the second swing arm is in the first position to receive a pin to lock the second swing arm in the first position. The bracket can further comprise of a third hole and the second swing arm comprises of a fourth hole which are aligned with each other when the second swing arm is in the second position to receive a pin to lock the second swing arm in the second position.

A third ladder rack assembly can be positioned apart from one of the pair of ladder rack assemblies across a latitudinal width of the bed of the truck. A removable cross bar can be extended across the latitudinal width of the bed of the truck attachable at one end to the one of the pair of ladder rack assemblies and attachable at the other end to the third ladder rack assembly across the latitudinal width of the bed of the truck.

DETAILED DESCRIPTION

Figure 1:
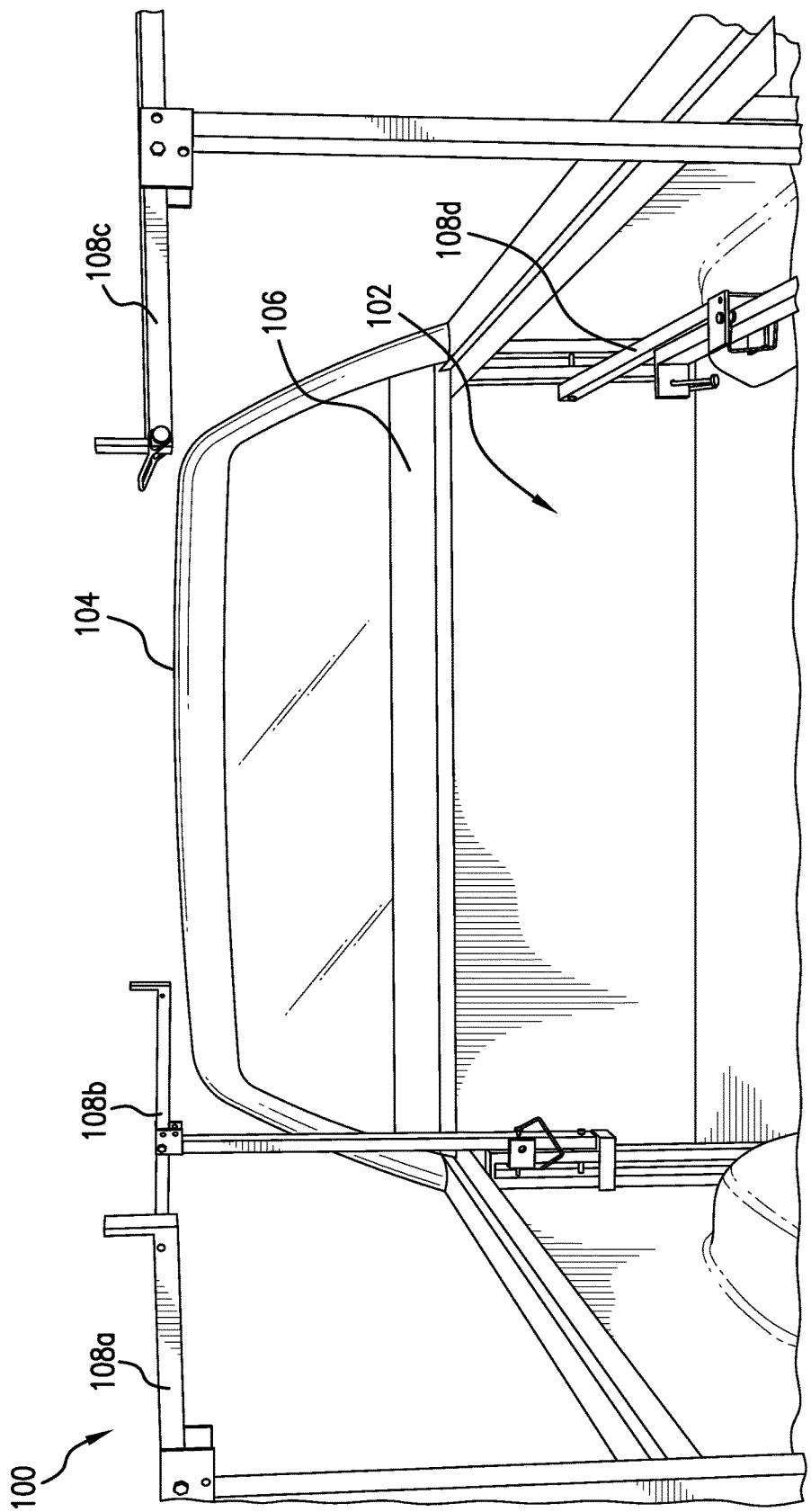
FIG. 1 shows a collapsible ladder rack fixed to a truck bed in the upright position according to this disclosure.

FIGS. 1 through 6 illustrate various views of one implementation of a collapsible ladder rack 100 according to this disclosure. Collapsible ladder rack 100 generally comprises of a pair of ladder rack assemblies positioned apart from each other along a longitudinal length of a bed 102 of a truck 104. In this regard, ladder rack assembly 108a and ladder rack assembly 108b comprise ladder rack 100. Ladder rack assembly 108c and ladder rack assembly 108d comprise another ladder rack assembly 100. Each ladder rack 100 is adapted for carrying at least one ladder.

Ladder rack 100 is designed to attach to the bed 102 of the truck 104. Ladder rack 100 can be collapsed and stored in a substantially unitary, secure, and reduced-volume configuration in bed 102 of truck 104, and can be easily extended for use. This allows, for example, ladder rack 100 to be collapsed and stored so that a topper or some other type of bed covering can be added to the top of bed 102 of truck 104 without having to disassemble and remove ladder rack 100.

Figure 2:
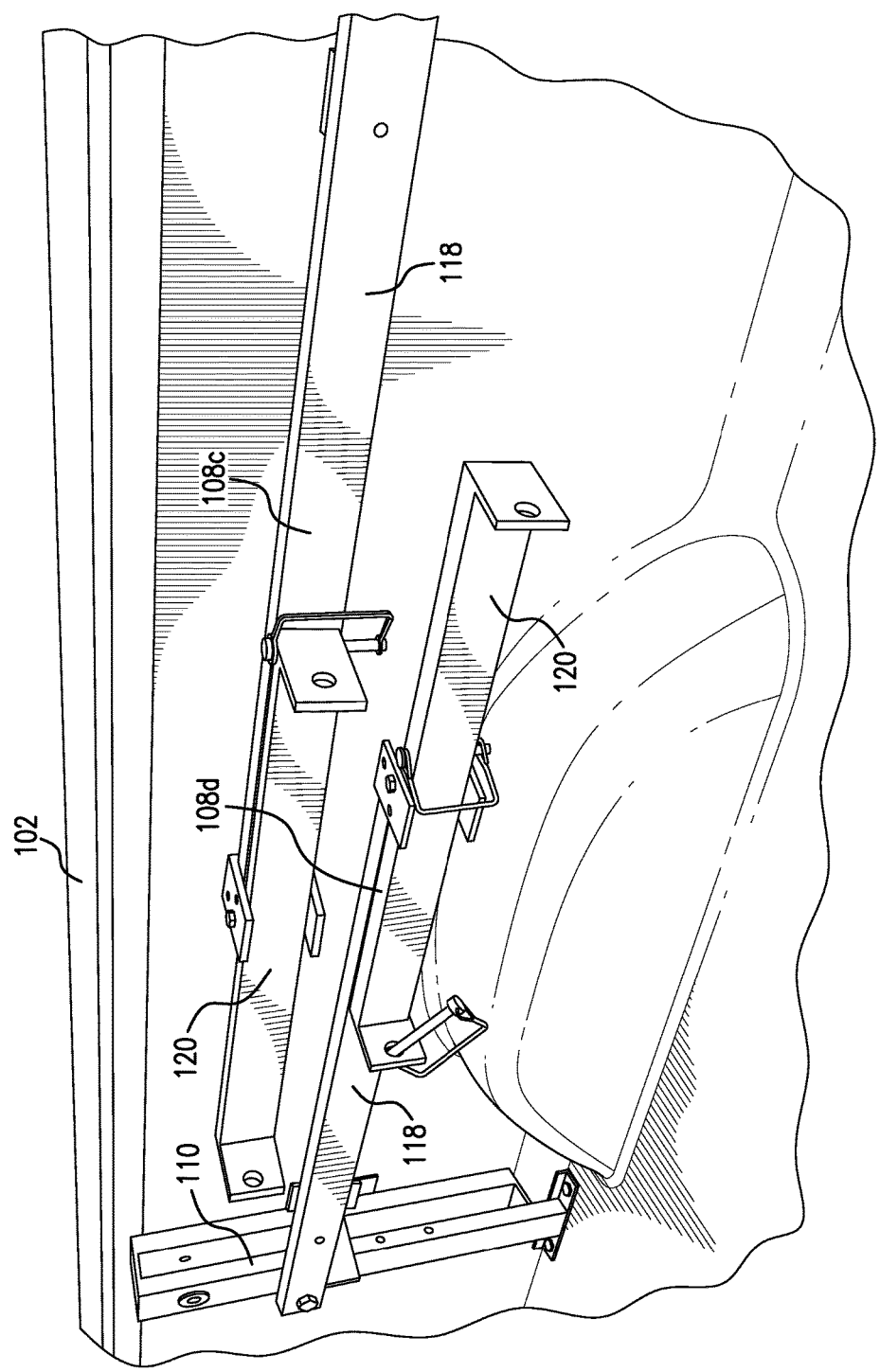
FIG. 2 shows the collapsible ladder rack of FIG. 1 fixed to a truck bed in the down position.
Figure 3:
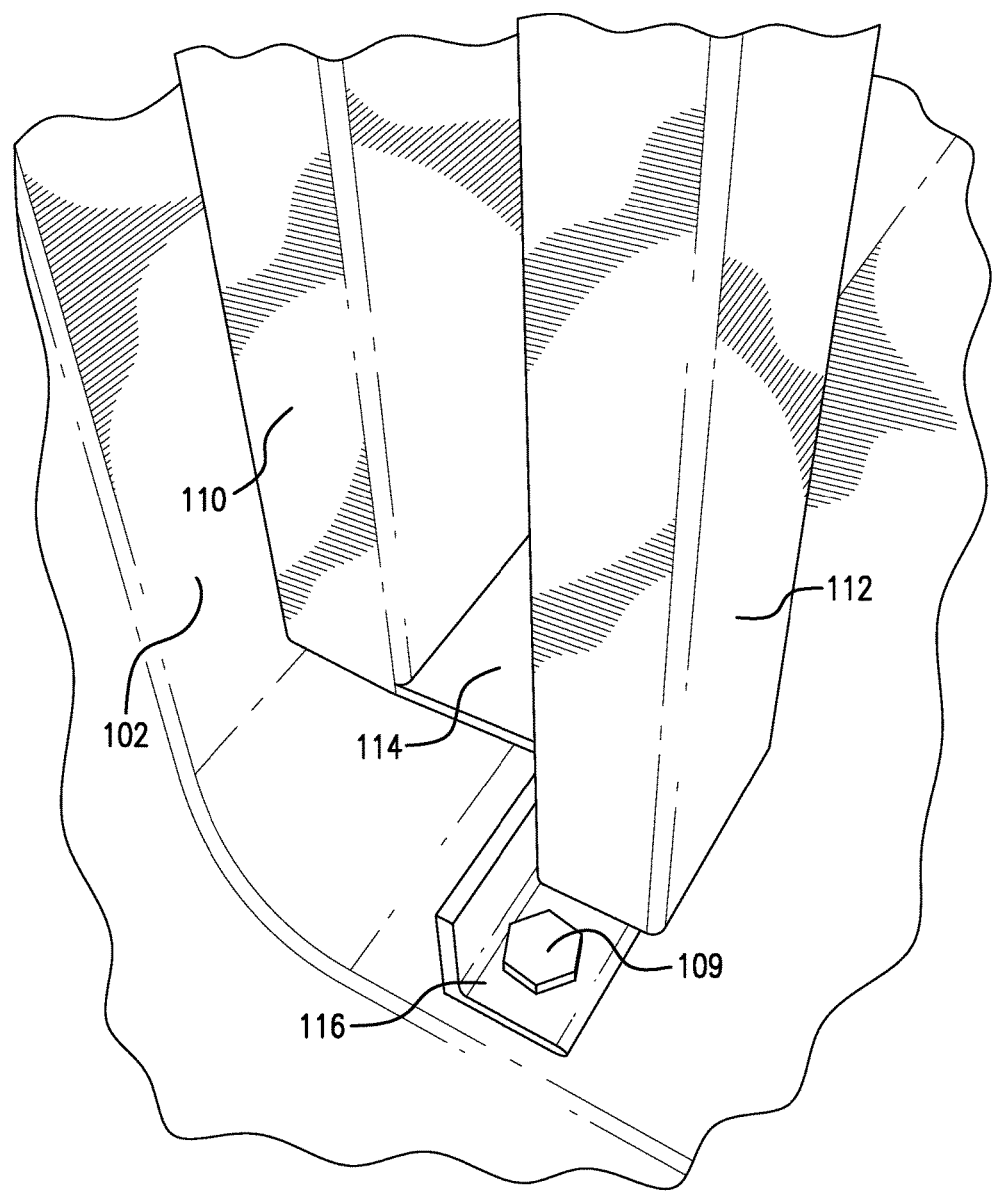
FIG. 3 shows a close up view of a first support member of the ladder rack of FIG. 1.

FIG. 2 shows ladder rack 100 on the right side of bed 102 of truck 104. Ladder rack assemblies 108c, 108d are shown in the down position. Each ladder assembly 108a, 108b, 108c, 108d, is the same, so for brevity only one ladder rack assembly 108 will be described with reference to ladder assembly 108. Ladder assembly 108 comprises of a first support member 110 that is attached vertically to a side of bed 102 of truck 104. Turning to FIG. 3, shown is a first support member 110 attached to the side of bed 102. Positioned apart from first support member 110, is a second support member 112. Second support member 112 is separated from first support member 110 by a spacer 114, which is used to provide a gap between first support member 110 and second support member 112, so the ladder assembly 108 can be assembled. A flange 116 is attached to the bottom of second support member 112 to attach second support member 112 to the bottom of bed 102 of truck 104.

A fastener 109 is used to attach flange 116 to bed 102 of truck 104. This way ladder rack assembly can be entirely removed from bed 102. First support member 110, second support member 112 and spacer 114 can be joined together in any manner, including by fasteners or weldments. Also, only one support member 112 can be used instead of first support member 110 and space 114.

Figure 4:
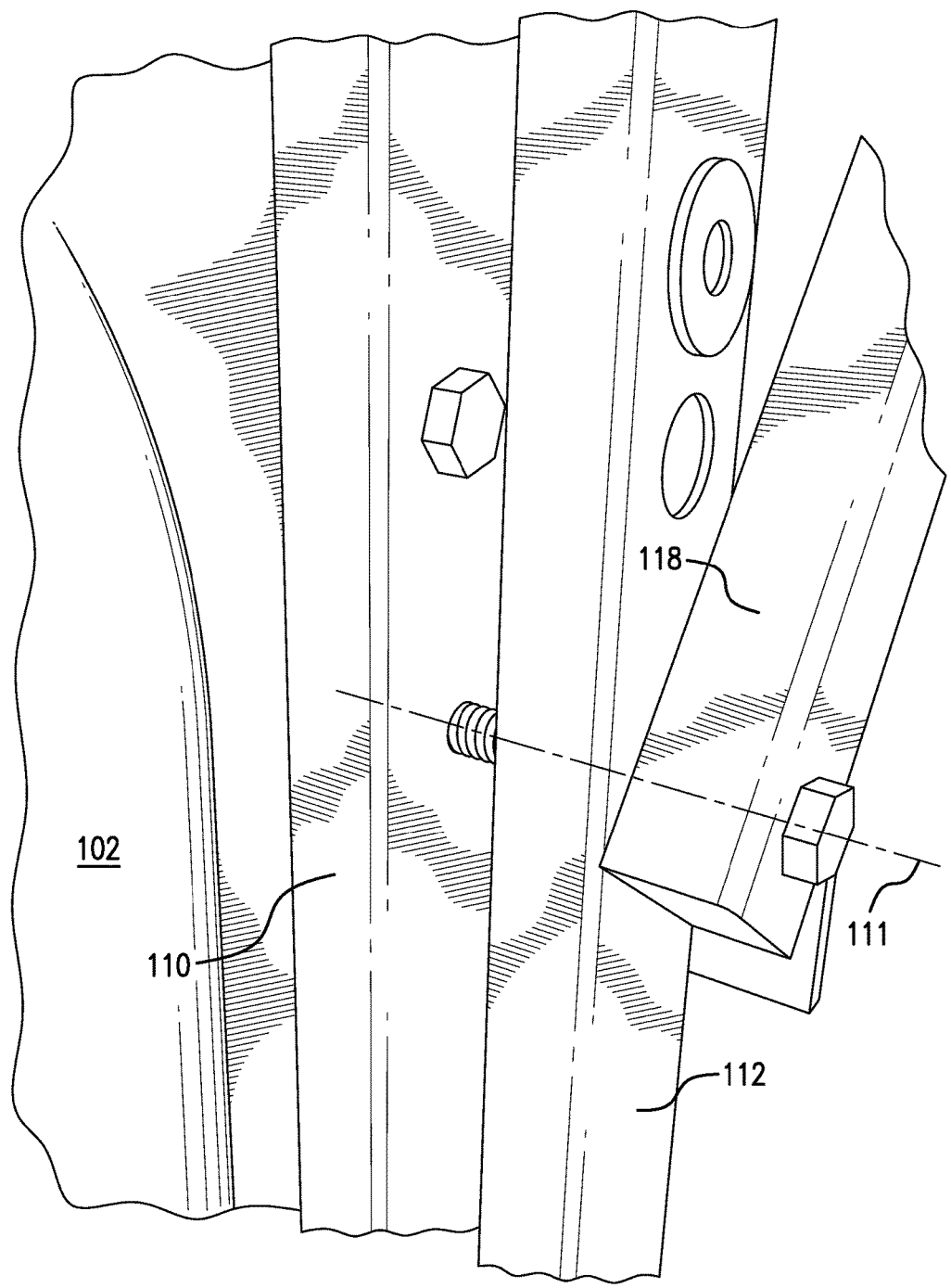
FIG. 4 shows another close up view of the first support member and a second support member of the ladder rack of FIG. 1.

Turning to FIG. 4, ladder assembly 108 further comprises of a first swing arm 118 pivotally attached to second support member 112 at one end. A first axis 111 extends through first support member 110 and first swing arm 118 about which first swing arm 118 moves between the first position and the second position. First axis 111 is defined by a first hole 113 in first support member 110 and a first hole 115 in first swing arm 118. A pin 115 extends through first hole 113 in first support member 110 and first hole 115 in first swing arm 118.

The first position of first swing arm 118 is a substantially horizontal position with bed 102 of truck 104. This allows first swing arm 118 to lie down in bed 102. One skilled in the art will recognize that the first position does not have to be exactly horizontal. A wide amount of tolerance is acceptable and within the range of "substantially" horizontal, with it merely being desirable that each ladder rack assembly 108 lays down with one above the other so that ladder rack 100 is compactly stored.

The second position of first swing arm 118 is a substantially vertical position. This extends first swing arm 118 upward from and out of bed 102 a maximum height. Similarly, wide variations in tolerance are acceptable with it merely being desirable to extend ladder rack assembly 108.

Figure 5:
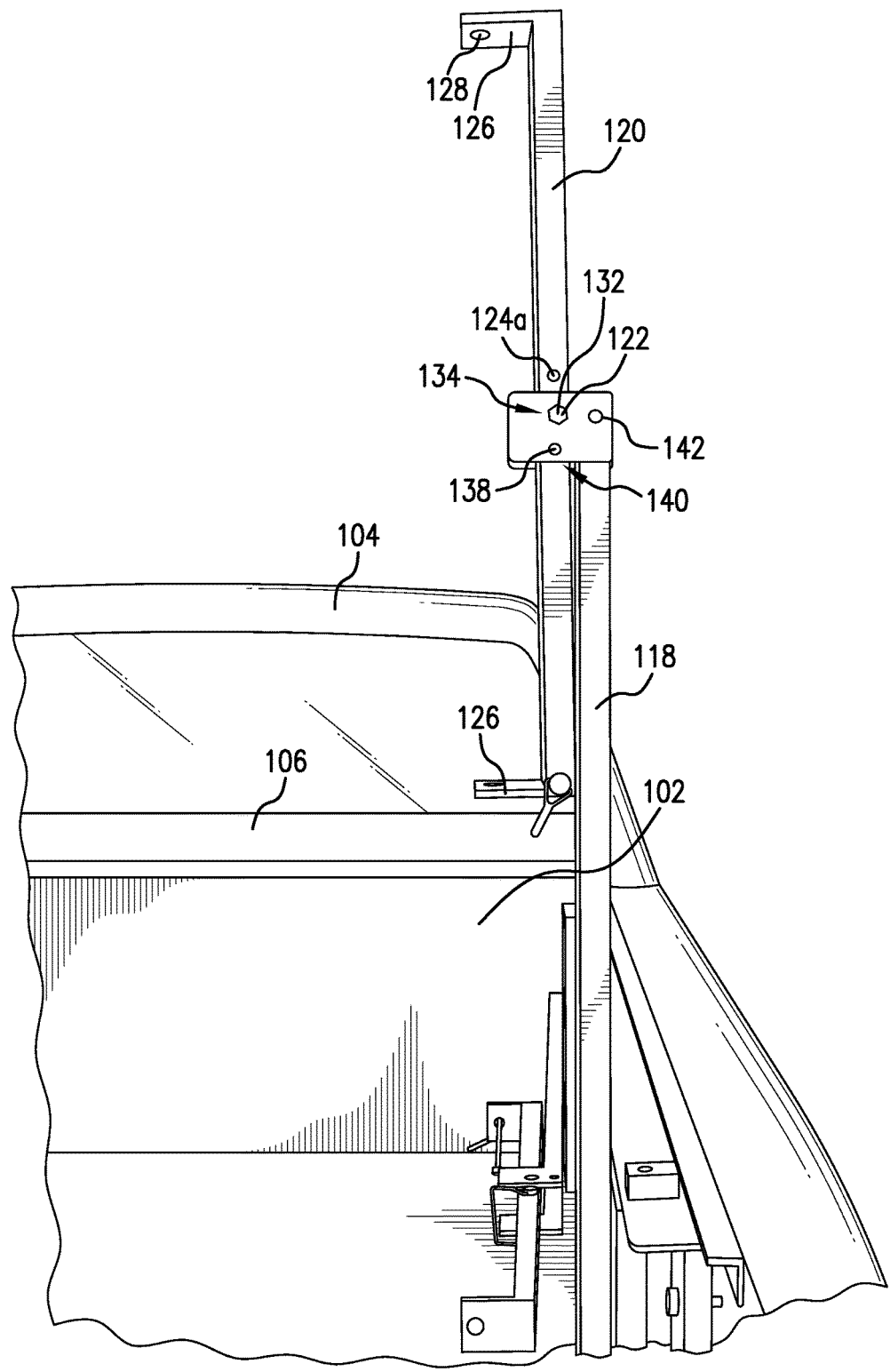
FIG. 5 shows a second swing arm of the ladder rack of FIG. 1 in a folded position.
Figure 6:
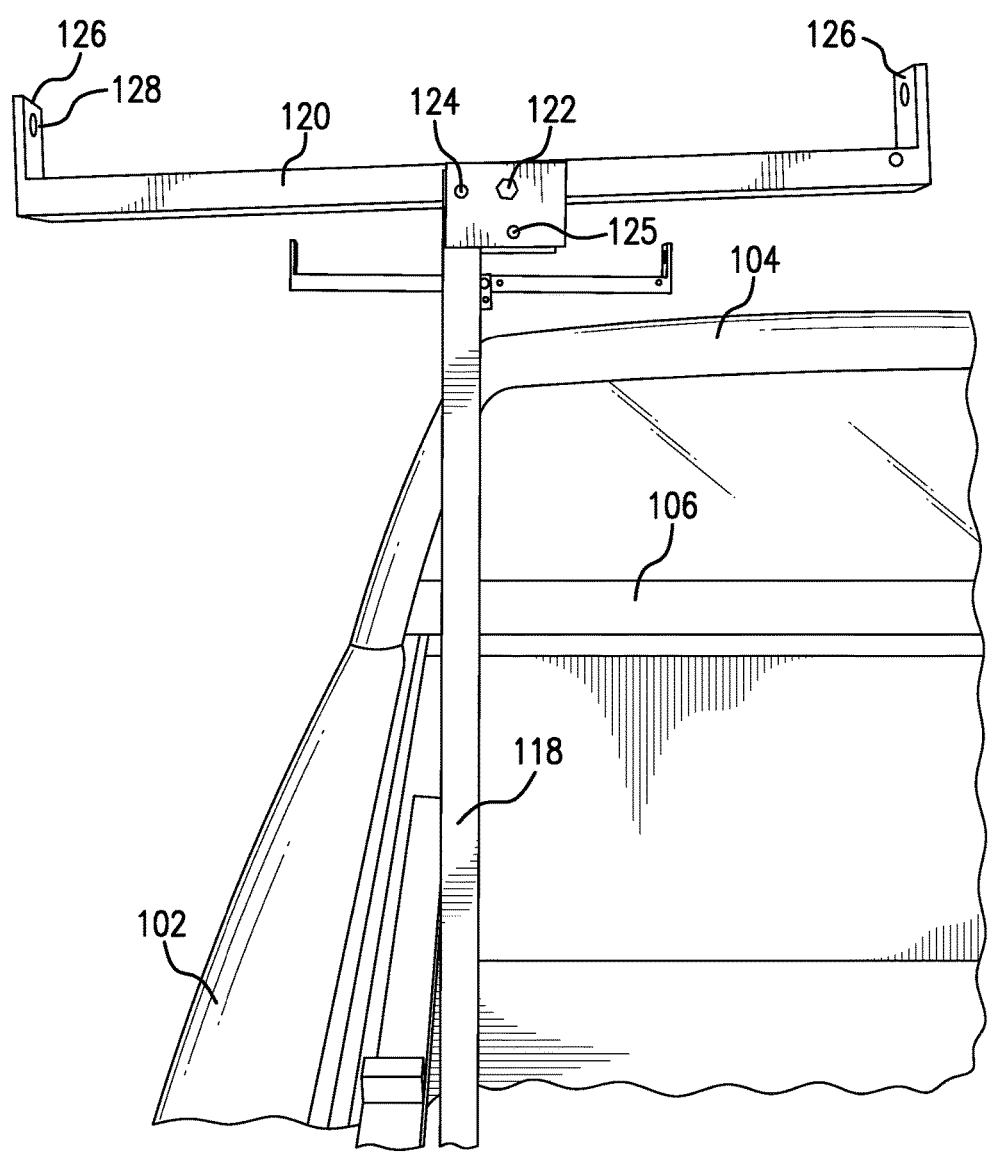
FIG. 6 shows the second swing arm of the ladder rack of FIG. 1 in an open position.

Turning to FIG. 5, shown is first swing arm 118 positioned in the upright position. Second swing arm 120 is in the first position, the closed position. This is the intermediate position between ladder assembly 108 being folded into bed 102 of truck 104 and the fully extended, as shown in FIG. 6. A bracket 130 is attached to first swing arm 118 near an end of first swing arm 118 opposite from first hole 115 in first swing arm 118. Bracket 126 extends perpendicularly from second swing arm 120, and comprises of a second axis 132 extending through bracket 126 and second swing arm 120 about which second swing arm 120 moves between the first position and the second position. Second axis 132 is defined a first hole 134 in bracket 126 and a second hole 136 in second swing arm 120 and a pin 122 extending through first hole 134 in bracket 126 and second hole 136 in second swing arm 120.

Bracket 126 can further comprise a second hole 138 and second swing arm 120 can comprise a third hole 140 which are aligned with each other when second swing arm 120 is in the first position to receive a pin to lock second swing arm 120 in the first position. Bracket can also comprise a third hole 142 and second swing arm 120 can comprise a fourth hole 124 which are aligned with each other when second swing arm 120 is in the second position to receive a pin to lock second swing arm 120 in the second position.

Ladder rack 100 can be easily folded down out of the way when not in use. It's positioned in such a manner that even bed cover 106 can be used when ladder rack 100 is installed. Simply fold each ladder assembly 108 down by pivoting second swing arm 120 closed and folding first swing arm 118 down into bed 102 of truck 104. To use, simply fold first swing arm 118 up and unfold second swing arm 120.

Figure 7:
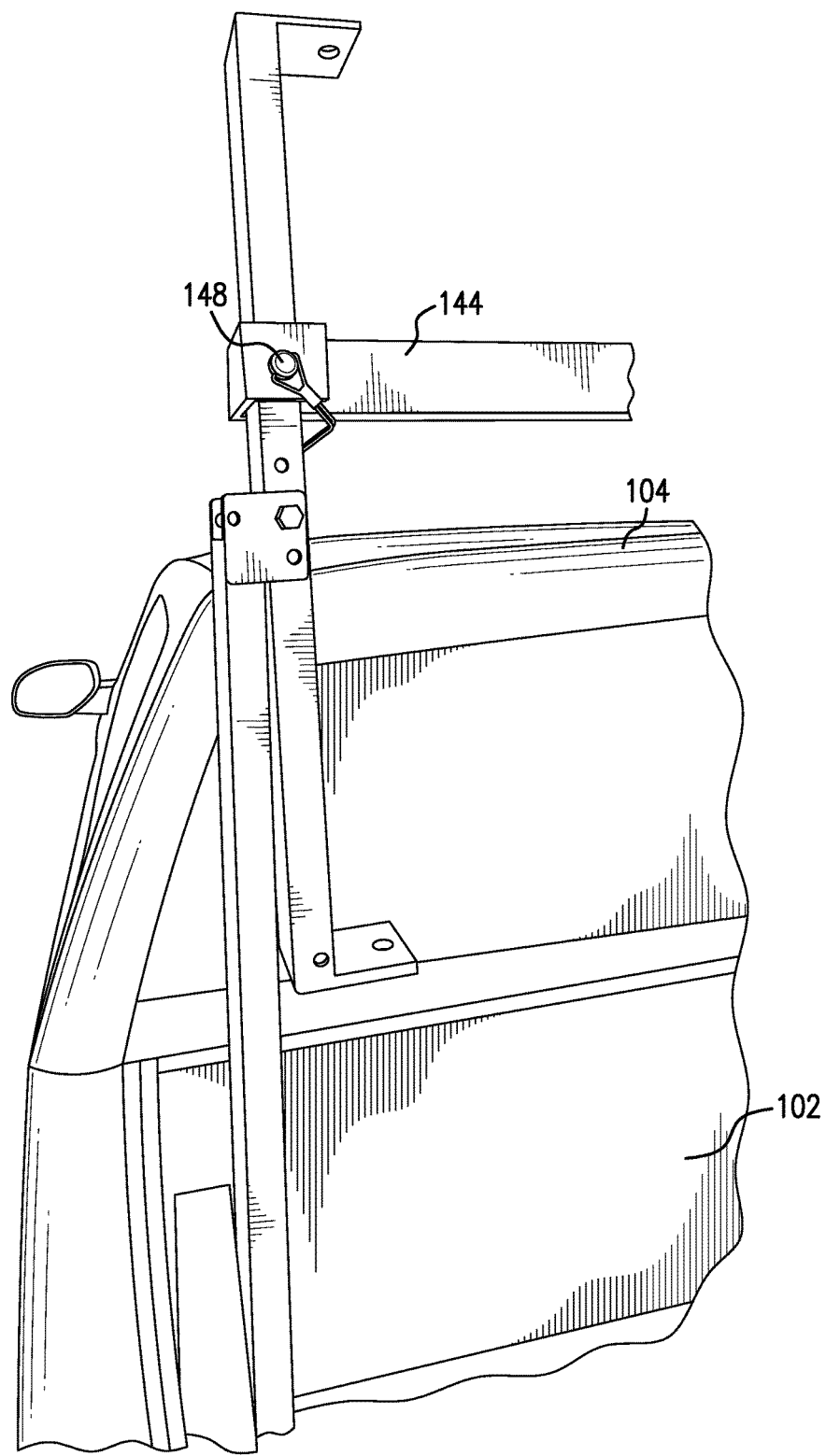
FIG. 7 shows a cross bar extendable across the bed of the truck.

Ladder rack 100 can also be easily configured to a general purpose truck rack. FIG. 7 shows ladder rack 100 with a cross member 144. In this implementation, a ladder assembly 108 is positioned with first swing arm 118 in the second position and second swing arm 120 in the first position. Another ladder rack assembly 108 on across a latitudinal width of bed 120 of truck 104 is similarly positioned; for example, ladder assembly 108b and 108d or ladder assembly 108a and ladder assembly 108c. Cross member 144 is removable and extending across the latitudinal width of bed 102 of truck 104 and attachable at each end to corresponding pairs of ladder assemblies (108a, 108c or 108b, 108d). Another removable cross bar 144 can be attached to the other of the corresponding pairs of ladder assemblies 108 to form a complete general purpose rack.

Figure 8:
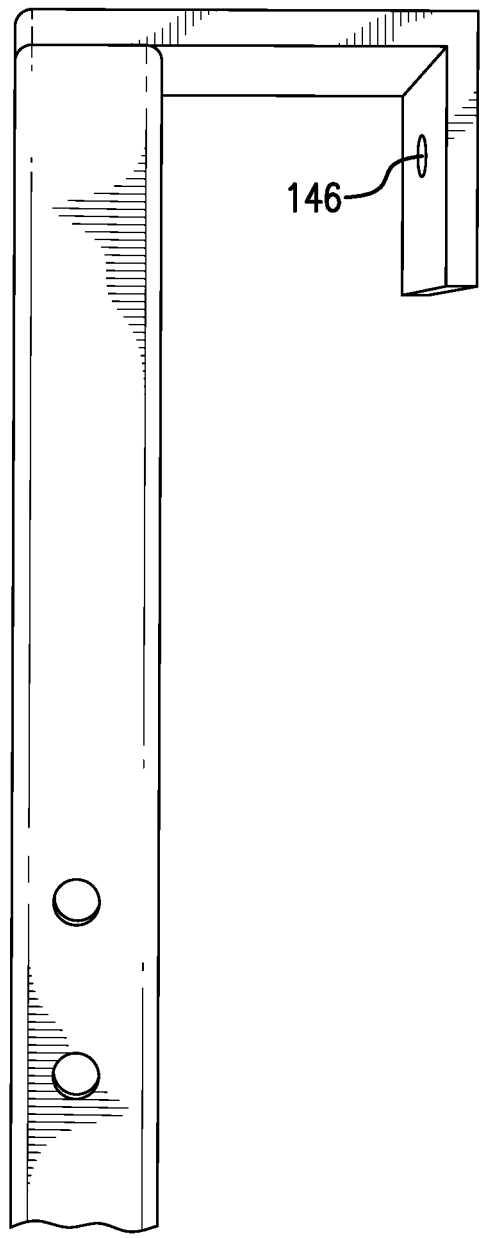
FIG. 8 shows the cross bar of FIG. 7.

Cross member 144 is shown in FIG. 8. Cross member has a through hole 146 that aligns with another hole in second swing arm 120. A pin 148 is used to combine cross member 144 with second swing arm 120.

Although not specifically illustrated in the drawings, it should be understood that additional equipment and structural components will be provided as necessary and that all of the components described above are arranged and supported in an appropriate fashion to form a ladder rack incorporating features of the present invention.

Moreover, although illustrative embodiments of the invention have been described, latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A ladder rack attachable to a bed of a truck for carrying a ladder, the ladder rack comprising:

a pair of ladder rack assemblies each attachable to the bed of the truck, wherein each ladder rack assembly is positioned apart from each other to support opposing ends of the ladder, wherein each ladder rack assembly further comprises:

a first support member attachable to the side of the truck;

a first swing arm pivotally attached to the first support member;

a second swing arm pivotally attached to the first swing arm, wherein the first swing arm move between a first position in the bed of the truck and a second position extending upward from the bed of the truck, and wherein the second swing arm moves between a first position substantially parallel with the first swing arm and a second position substantially perpendicular to the first swing arm; and wherein the pair of ladder rack assemblies are positioned apart from each other along a longitudinal length of the bed of the truck, and further comprising a third ladder rack assembly positioned apart from one of the pair of ladder rack assemblies across a latitudinal width of the bed of the truck, and a removable cross bar extending across the latitudinal width of the bed of the truck attachable at one end to the one of the pair of ladder rack assemblies and attachable at the other end to the third ladder rack assembly.

2. The ladder rack of claim 1, wherein the first position of the first swing arm is a substantially horizontal position.

3. The ladder rack of claim 2, wherein the second position of the first swing arm is a substantially vertical position.

4. The ladder rack of claim 1, and further comprising a first axis extending through the first support member and the first swing arm about which the first swing arm moves between the first position and the second position.

5. The ladder rack of claim 4, wherein the first axis is defined by a first hole in the support member and a first hole in the first swing arm and a pin extending through the first hole in the first support member and the first hole in the first swing arm.

6. The ladder rack of claim 5, and further comprising a bracket attached to the first swing arm near an end of the first swing arm opposite from the first hole in the first swing arm.

7. The ladder rack of claim 6, wherein the bracket extends perpendicularly from the second swing arm, and the bracket further comprises a second axis extending through the bracket and the second swing arm about which the second swing arm moves between the first position and the second position.

8. The ladder rack of claim 7, wherein the second axis is defined by a first hole in the bracket and a second hole in the second swing arm and a pin extending through the first hole in the bracket and the second hole in the second swing arm.

9. The ladder rack of claim 8, wherein the bracket further comprises of a second hole and the second swing arm comprises of a third hole which are aligned with each other when the second swing arm is in the first position to receive a pin to lock the second swing arm in the first position.

10. The ladder rack of claim 9, wherein the bracket further comprises of a third hole and the second swing arm comprises of a fourth hole which are aligned with each other when the second swing arm is in the second position to receive a pin to lock the second swing arm in the second position.

\* \* \* \* \*